United States Patent [19]
Gordon

[11] Patent Number: 5,069,987
[45] Date of Patent: Dec. 3, 1991

[54] SOLID OXIDE FUEL CELL ASSEMBLY

[75] Inventor: Arnold Z. Gordon, Beachwood, Ohio

[73] Assignee: IGR Enterprises. Inc., Cleveland, Ohio

[21] Appl. No.: 549,466

[22] Filed: Jul. 6, 1990

[51] Int. Cl.$^5$ .............................................. H01M 8/10
[52] U.S. Cl. ......................................... 429/31; 429/34
[58] Field of Search ................................... 429/30–33, 429/191, 193; 204/421; 428/364; 501/95

[56] References Cited
U.S. PATENT DOCUMENTS

| | | | |
|---|---|---|---|
| 4,462,891 | 7/1984 | Lawless | 429/30 X |
| 4,764,488 | 8/1988 | Saito et al. | 501/95 |
| 4,847,172 | 7/1989 | Maskalick et al. | 429/30 |
| 4,861,345 | 8/1989 | Bowker et al. | 429/31 X |
| 4,883,497 | 11/1989 | Claar et al. | 429/33 X |

Primary Examiner—Anthony Skapars
Attorney, Agent, or Firm—Niblack & Niblack

[57] ABSTRACT

There is provided a solid oxide fuel cell comprising a solid state electrolytic cell wherein the solid electrolyte is a ductile composite comprising an ordered, repeating array of ductile intersupported continuous fibers substantially surrounding a ceramic matrix, and means for connecting the cell to an electrical load whereby when current is passed through the cell, fuel and air are converted into electric power.

11 Claims, 2 Drawing Sheets

SOLID OXIDE FUEL CELL ASSEMBLY

BACKGROUND OF THE INVENTION

The present invention relates to fuel cells and more specifically relates to solid oxide fuels cells.

The direct conversion of chemical energy in a fuel cell has been one of the most challenging technological problems since simple hydrogen/oxygen fuel cell was first demonstrated 150 years ago by Groves at the London Institution. Aqueous electrolyte fuel cells have been used in space to power electrical equipment in the Apollo spacecraft and in the space shuttle, but terrestrial applications have been confined to a few specialized military and telecommunications.

In the original concept of a fuel cell, a primary fuel such as hydrogen or hydrocarbons, is reacted with oxygen in an electrochemical cell incorporating an acid electrolyte wherein the following reactions occurred:

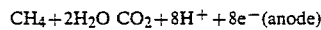

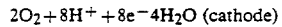

whereby the free energy of oxidation of the fuel was converted directly into electrical energy, carbon dioxide and water.

The basic element of a fuel cell consists of an electrolyte phase in contact with a porous anode and cathode on either side.

Various types of fuel cells have been investigated and differ largely in the type of electrolyte employed. See A. Fickett, in *Handbook of Batteries and Fuel Cells*, by D. Linden, McGraw-Hill Book Co., New York, N.Y. (1984) p. 41-10. Five major classes of fuel cells have emerged. These include the polymer electrolyte fuel cell (PEFC), the alkaline fuel cell (AFC), phosphoric acid fuel cells (PAFC), molten carbonate fuel cells (MCFC) and solid oxide fuel cells (SOFC). The respective operating temperatures for these fuel cells are approximately 80°, 100° C., 200° C., 650° C. and 1000° C. respectively.

In the case of the PAFCs, MCFCs and SOFCs, the fuel and oxidant gases flow past the backside of the anode and cathode, respectively, and generate electrical energy by the electrochemical oxidation of the fuel, usually hydrogen, and the electrochemical reduction of oxygen. A three-phase boundary is established in the region of the porous electrode/electrolyte/reactant interface. The nature of this interface plays a critical role in the electrochemical performance of a fuel cell, particularly those with a liquid electrolyte. In such fuel cells, the reactant gases diffuse through a thin electrolyte film that wets portions of the porous electrode. Thus a delicate balance must be maintained among the electrode, electrolyte and gaseous phases in the porous electrode structure. Much of the recent effort in the development of fuel-cell technology has been devoted to refining and improving the electrode structure and electrolyte phase, with the aim of obtaining a higher and more stable electrochemical performance.

The electrolyte not only transports dissolved reactants to the electrode, but it also conducts ionic charge between the electrodes and thereby completes the cell electric circuit. In the low temperature fuel cells (PEFC, AFC, PAFC), protons or hydroxyl ions are the major charge carriers in the electrolyte, whereas in the high-temperature fuel cells (MCFC and SOFC) carbonate ions and oxygen ions are the charge carriers, respectively. The SOFC must be operated at about 1000° C. because the transport rate of oxygen ions in the prior art solid oxide electrolyte is adequate for practical applications only at such high temperatures.

In 1988, the U.S. Department of Energy identified three basic fuel cell-types of current importance for near-term commercialization are the phosphoric acid fuel cells, molten carbonate fuel cells and solid oxide fuel cells. See Fuel Cells A Handbook, May 1988, U.S. Department of Energy, Office of Fossil Energy, Morgantown Energy Technology Center, Morgantown, W. Va., DOE/METC-88/6096.

While such cells provide an exciting option for the efficient conversion of fossil fuels to electricity, and could result in automobiles with mileagees of 160 mpg or higher, as well as for stationary power plants and portable power plant applications, current technology has a number of problems.

Polymer electrolyte fuel cells (PEFC) employ an electrolyte which is an ion-exchange membrane (fluorinated sulfonic acid polymer) that is an excellent proton conductor. The only liquid in this fuel cell is water, thus corrosion problems are minimal. Water management in the membrane is critical for efficient performance. Thus, the fuel cell must operate under conditions where the by-product water does not evaporate faster than it is produced because the membrane must be hydrated. Because of limitations on the operating temperature, usually less than 120° C., $H_2$-rich gas with little or no CO is used, and higher Pt loadings than those used for the PAFCs are required in both the anode and cathode. It remains to be seen whether this type of fuel cell can be successfully commercialized.

Phosphoric acid fuel cells (PAFC) were originally developed for operation on hydrocarbon fuels. Because the fuel cell can only utilize hydrogen derived from primary hydrocarbon fuels, it is necessary for the system to incorporate a fuel processing unit which adds steam to convert the primary hydrocarbon fuel to hydrogen and carbon monoxide. Adding this unit reduces overall electrical/fuel conversion to around 40%. The PAFC fuel cells employ porous electrodes which are fabricated from a specially developed, finely divided carbon black onto which crystallites (2-5 nm) of an electrocatalyst such as platinum are deposed. This component is supported on a porous carbon-paper substrate to form a composite structure which forms a stable three-phase interface in the fuel cell. The electrolyte is phosphoric acid which is a hazardous material.

The molten carbonate fuel cell (MCFC) is one of the two high-temperature systems regarded as "second generation" fuel cells. The MCFC has been in development for about 10 years, particularly in the United States and Japan, and units in the range of 1-20 kW are currently being evaluated. However, these systems suffer from severe corrosion of many of the components by the molten salt electrolyte.

Special features of the alkaline fuel cell (AFC) such as readily available fuel and oxidant already present for rocket motors made this system an attractive power unit for the American space program. For example, 1.5 kW units were incorporated on the Apollo space craft used to take astronauts to the moon, and three 12 kW units provide the electrical supply power for the space shuttle. This fuel cell is widely used for aerospace and defense applications and is available as a reliable, well-proven system. However, it is very expensive to operate, requiring pure hydrogen and oxygen and relatively expensive electrode materials such as finely divided platinum or gold/platinum on carbon porous electrodes. Thus a need remains for an efficient, cost effective fuel cell which can be employed in more mundane, but equally important applications such as in automobiles, electric power plants and other industrial applications.

The last major class of fuel cell is the solid oxide fuel cell (SOFC). This system incorporates a ceramic solid oxide, typically with a composition of $Zr_{0.9}Y_{0.1}O_{1.95}$. The anion vacancies created by introducing aliovalent $Y^{3+}$ ions on the $Zr^{4+}$ sites produce an oxygen ion conductor with a conductivity at 1000° C. comparable to liquid electrolytes in the room temperature −2,000° C. temperature range. Because the electrolyte is solid, the electrolyte management problems associated with other fuel cell types are eliminated. Further, the high-temperature operation allows in situ reforming of hydrocarbon fuels and electricity/fuel conversion efficiencies are expected to be higher than with other systems.

Attempts to construct SOFC systems during the period 1970–1975, while technically successful and resulting in small (10 W) units which operated for more then 30,000 hours, the cost efficient assembly of strong, tough ceramic components was difficult and most projects were abandoned by the mid-1970's. The 1980's has seen a resurgence of interest in the SOFC systems because developments in ceramic technologies allowed fabricating monolithic ceramic electrolyte configurations incorporating thin, strong, tough components with high area/volume ratios.

A tubular configuration was used in various projects during the 1970's and this design has been optimized by Westinghouse and scaled up to produce 5 kW. See B. C. H. Steele, MRS Bulletin/June 1989, p. 23. The Westinghouse unit comprises a bundle of tubular solid oxide fuel cells in cooperation with an array of multiple air injector tubes (one for each fuel cell unit) with spacers to define an air plenum chamber, a combustion chamber, and a fuel plenum chamber.

More recently, increased attention has been devoted to planar configurations of the type depicted in FIG. 3. In the prior art planar arrangements, ceramic electrolyte plates approximately 100–200 m thick having fracture stress around 800 MPa and fracture toughness ($K_{IC}$) in the 5–10 MPa m$^{\frac{1}{2}}$ range have been reported. Because ceramics are inherently brittle, there is a strong dependence of mechanical failure characteristics on microstructural features, and improved ceramic materials are needed to improve the reliability, performance and operating life of solid oxide fuel cells. The present invention provides such an electrolyte.

The other principal structural component of planar solid oxide fuel cell components is a bi-polar plate incorporating gas channels. Prior art bi-polar plates are usually fabricated from the well proven electronically conductive material $LaCr_{0.9}Mg_{0.1}O_3$ because of its compatibility with other components, which has been demonstrated in the tubular configurations. The porous cathode of the prior art planar solid oxide fuel cell design usually consists of $La_{0.85}Sr_{0.15}MnO_3$ and the porous anode, a thin layer of $NiZr(Y)O_{2-x}$ cermet. If porosity and pore size distribution of the electrodes are carefully controlled during the processing stage, these components provide stable three-phase electrode-solid electrolyte-gas interfacial regions.

To date, no solid oxide fuel cells are commercial because the problems inherent in the prior art designs have not been overcome. The role of materials technologist is considered crucial to the success of this ceramic-based system. The present invention employs a novel, ductile ceramic composite as the solid electrolyte which is more rugged than anything provided in the prior art, and which overcomes the problems associated with ceramic electrolytes, particularly in large, flat plate applications.

For a detailed review of the prior art, see A. J. Appleby and F. R. Foulkes, *Fuel Cell Handbook* (Van Nostrand, 1989); "Assessment of Research Needs for Advanced Fuel Cells" in *Energy*, Vol. 11, edited by S. S. Penner (1986) p. 1–229; S. Srinivasan, "Fuel Cells for Extraterrestrial and Terrestrial Applications," *J. Electrochem. Soc.* 136, 41C, 1989; B. C. H. Steele et al., *Direct Electrochemical Oxidation of Methane in Ceramic Electrochemical Reactors*, Abstract of 1988 Fuel Cell Seminar (Oct. 23–26, 1988, Long Beach, Calif.); B. C. H. Steele, "Materials Engineering and Fuel Cell Development", *MRS Bulletin/June* 1989, pp. 19–23, "Fuel Cells A Handbook", U.S. Department of Energy, Office of Fossil Energy, Morgantown Energy Technology Center, Morgantown, W. Va. (May 1988).

A principal limitation of current attempts to develop practical SOFC units is the brittle failure of the multilayer all ceramic stack, in particular during thermal cycling. These designs generally involve the careful accumulation of sintered layers of different ceramic phases, each layer representing a separate function such as air electrode, interconnect, or electrolyte. The present invention provides a superior solid electrolyte and an improved, simplified planar design for solid oxide fuel cells.

A great deal of effort has gone into the preparation of high-toughness ceramic composites. Ceramics generally possess a number of desirable properties, including markedly high resistance to abrasion, heat and corrosion as compared with metallic materials. They have been widely used in a number of commercial applications. Certain ceramics, such as stabilized bismuth solid oxides, stabilized ceria solid oxides and zirconia solid oxides are ionically conductive materials rendering them suitable for use as solid electrolytes. However, due to extremely high brittleness, their application has been limited despite their excellent properties.

There have been a number of attempts to increase the toughness of ceramic materials by compounding them with another material such as ceramic or metal fragments including silicon carbide whiskers. Composites with ceramic matrices and ductile metal inclusions such as those produced by Lanxide Corporation show high fracture toughness when compared to ordinary ceramic materials. See for example U.S. Pat. Nos. 4,824,622; 4,847,220; 4,822,759; 4,820,461; and related 4,871,008. These composites are a chaotic, generally discontinuous, random metal dispersion in a ceramic composite body. They are prepared by controlled oxidation of molten aluminum to alumina oxide, leaving behind approximately 5% of the parent metal. See also C. A. Anderson et al., *Ceram. Eng. Sci. Proc.*, 9 [7–8] pp. 621–626 (1988); and M. S. Newkirk et al., *Ceram. Eng. Sci. Proc.*, 8 [7–8] pp. 879–885 (1987).

U.S. Pat. No. 4,764,488 discloses a high toughness ceramic composite of the fiber-reinforced type wherein metal fibers having the shape of triangular waves forming bent portions alternating on the opposite sides with an angle δ of the bent portions in a range between 60° and 165° and a d/H ratio of between 0.025 and 0.6. While the discrete, discontinous fibers, unidirectionally anchored fiber reinforcement employed in the-488 patent improve the toughness of the ceramic, it does not solve the problem of crack propagation and ultimate failure.

U.S. Pat. No. 4,776,886 discloses a whisker-reinforced ceramic matrix composite comprising a principal crystal phase selected from the group consisting of anorthite, barium-stuffed cordierite and mixed cordierite/anthorite prepared by extrusion of extrudable ceramic batches comprising an extrusion vehicle and a solids component comprising essentially inorganic whiskers and powdered glass.

The novel composite employed in the practice of this invention is mechanically rugged. When subjected to intentionally severe mechanical stress, such as bending in half and straightening, the crack that resulted was limited to the stress or fold line.

This tough, ductile solid electrolyte composite permits the construction of a superior solid oxide fuel cell.

SUMMARY OF THE INVENTION

The solid oxide fuel cell of the present invention employs a mechanically rugged, ductile solid electrolyte ceramic composite comprising a regular, repeating array of ductile ordered, continuous metallic fibers substantially surrounded by or imbedded in and supporting a ceramic matrix as the solid electrolyte in either a planar, arcuate, folded or tubular cell. The cell is connected to an electrical load, whereby when current is generated from the cell, fuel and air are converted to electric power.

In a preferred embodiment, ceramic composites were prepared from 8 mole percent ytterbia stabilized zirconia and 9 mole percent yttria-stabilized zirconia as the ceramic phase and compounded with planar 60 mesh square weave Inconel 600 or Inconel 600 expanded foil as the ductile phase/array to yield a sheet of solid oxide electrolyte composite suitable for a mechanically tough solid oxide fuel cell. This physical array allows for approximately 90% of the volume of the composite to be the solid electrolyte, resulting in a high level of ionic conductivity through the plane of the composite.

The ytterbia materials were prepared from an alkoxide based sol-gel formulation in accordance with one embodiment of the present invention.

BRIEF DESCRIPTION OF THE DRAWINGS

The present invention will be better understood in view of the following description, taken in conjunction with the drawings in which.

DETAILED DESCRIPTION OF PREFERRED EMBODIMENTS

Figure 1:
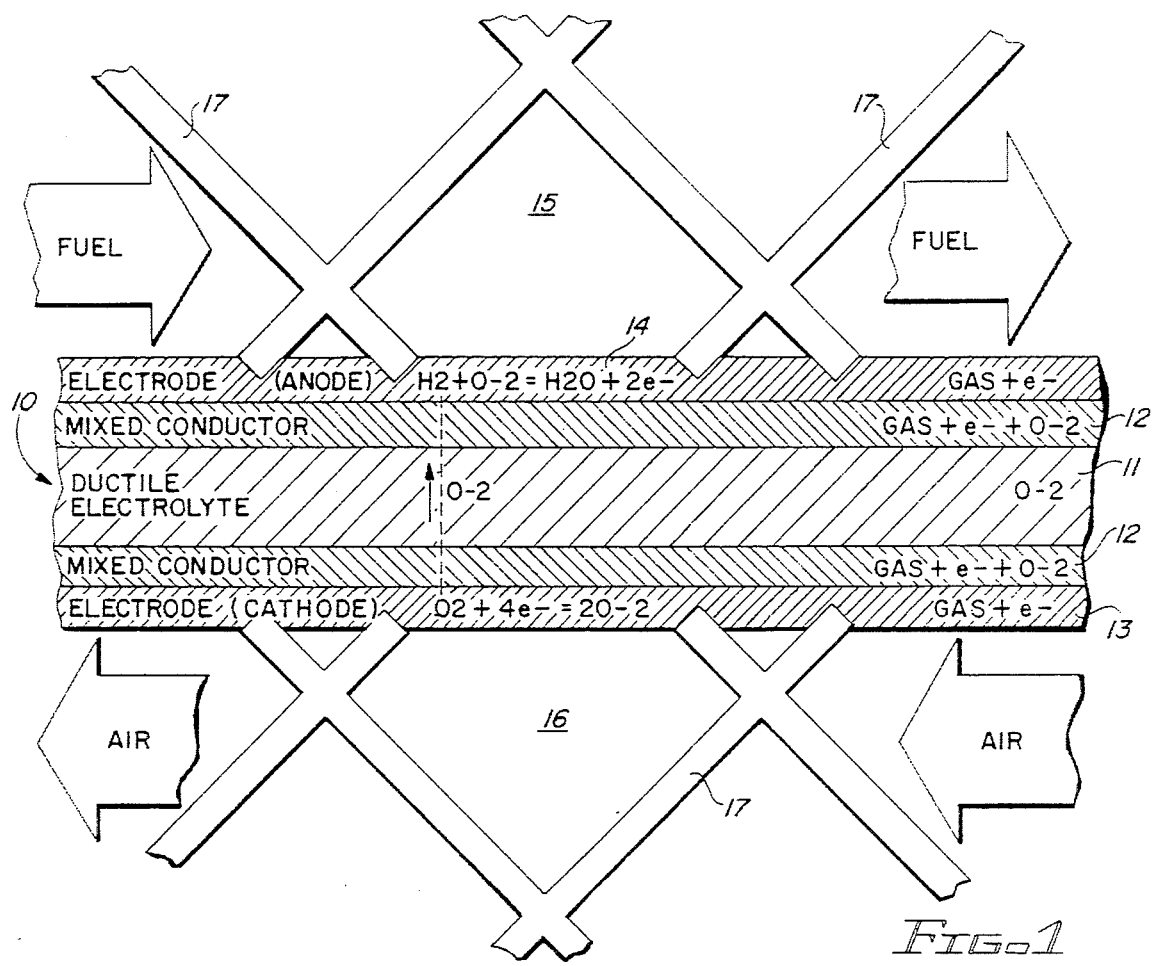
FIG. 1 is an electrochemical schematic flow diagram of a ductile solid oxide fuel cell in accordance with the present invention.

Referring to FIG. 1, an electrochemical schematic for a solid oxide fuel cell in accordance with this invention is shown. Planar cell 10 comprises a center layer 11 which is the ductile electrolyte composite unique to this invention. A mixed conductor (ionically and electronically conductive) layer 12 is disposed on either side of the planar center layer 11 in intimate contact therewith. Outer layers 13 and 14 are electrodes (cathode and anode respectively). Fuel plenum chamber 15 is disposed on the anode side of the cell and air plenum chamber 16 is disposed on the cathode side of the cell. Current collectors 17 are included within the plenum chambers, contacting each electrode layer and extending through each plenum chamber to contact the bipolar plenum wall (not shown). While positive electrical contact across each chamber segment is required, the chamber current collectors are composed of material fabricated or structured so as to allow free passage of gas and not cause a significant drop in pressure through the chambers.

Figure 2:
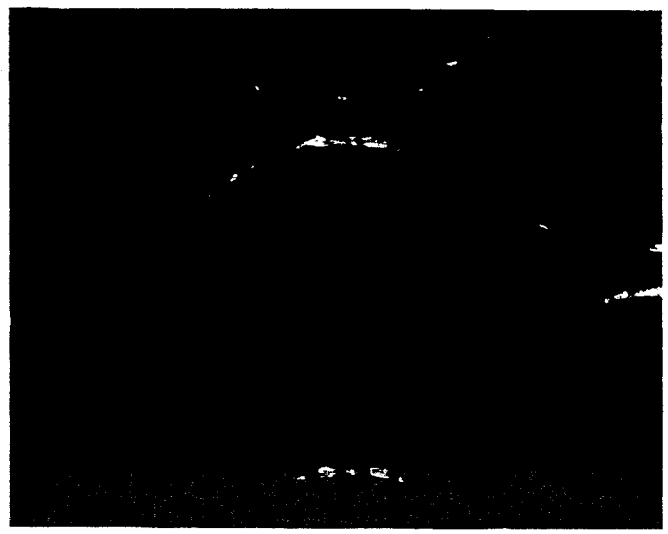
FIG. 2 is a photomicrograph of the preferred ductile array employed in the composite of this invention.

As best shown in FIG. 2, a preferred embodiment of the ductile component of the solid electrolyte composite employed in the practice of this invention is an interconnected, planar array of metallic ligaments forming a repeating diamond pattern. The line of sign openness of this array is about 65–70%. The ceramic volume fraction of the solid electrolyte ceramic composite composition of this invention is from 10 to 90%. The preferred ceramic volume fraction of the final ceramic composite is about 90%.

The preferred material for the ordered, ductile array is a single layer of an open mesh metal structure. Especially preferred are expanded metal foils such as Haynes 214 expanded metal foil. Especially preferred is an expanded metal foil produced in accordance with this invention from a solid sheet of Inconel 600 foil with an original thickness of 0.003".

The solid electrolyte composite is a thin sheet-like structure having a thickness of 0.01 inch or less. It is preferred that the composite have a thickness of 0.003 inch or less. It may be square, rectangular, corrugated, circular, tubular, and the like. For best results it is preferred that the composite body employed in the electrolytic cell, which forms the essential element of the fuel cell of this invention, is at least 4 inches on a side, preferably 6 inches or more in diameter if round to provide an equivalent surface area. Size will depend upon the end application.

In the solid electrolyte composite formulated in accordance with a preferred embodiment, there is a repeating pattern of interconnected members of high ductility extending throughout the structure in repeating ordered forms including, for example a basket weave configuration, as well as the particularly preferred diamond structure illustrated.

Figure 3:
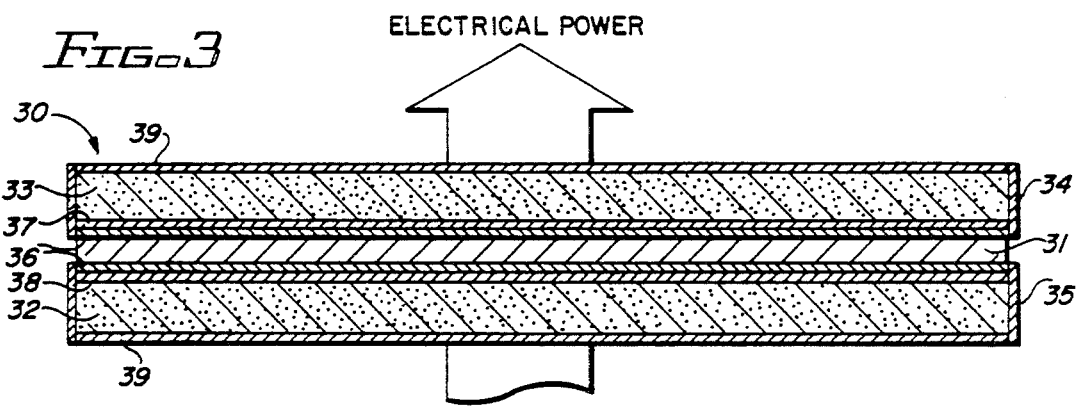
FIG. 3 is a schematic of the basic cell and gas pathway design, shown in single segment form, employed in a repeating planar stack solid oxide fuel cell in accordance with the present invention.

FIG. 3 illustrates the physical arrangement of the a basic, repeating manifolded cell design which is employed in a stack arrangement for a solid oxide fuel cell in accordance with this invention. Cell 30 comprises a symmetric "sandwich" with the ionically conductive solid electrolyte composite as the center layer 31. On either side of the solid electrolyte center layer 31 are electronically conductive porous metallic plenum chamber current pickups 32 and 33. Woven Inconel 600 cloth was coated with commercial silver based paste to act as current collector and to allow for the passage of gases in the plenum passageways 34 and 35 which serve as the fuel and air plenums respectively. Mixed conduction (ionically and electronically conductive) sub-electrode layers 36 are disposed between the solid electrolyte composite 31 and outer thin layer electrodes 37 and 38. Bipolar plenum chamber walls 39 were ⅛ inch thick layers of Haynes 214 alloy sheet which are in contact with the current pickups 32 and 33.

Figure 4:
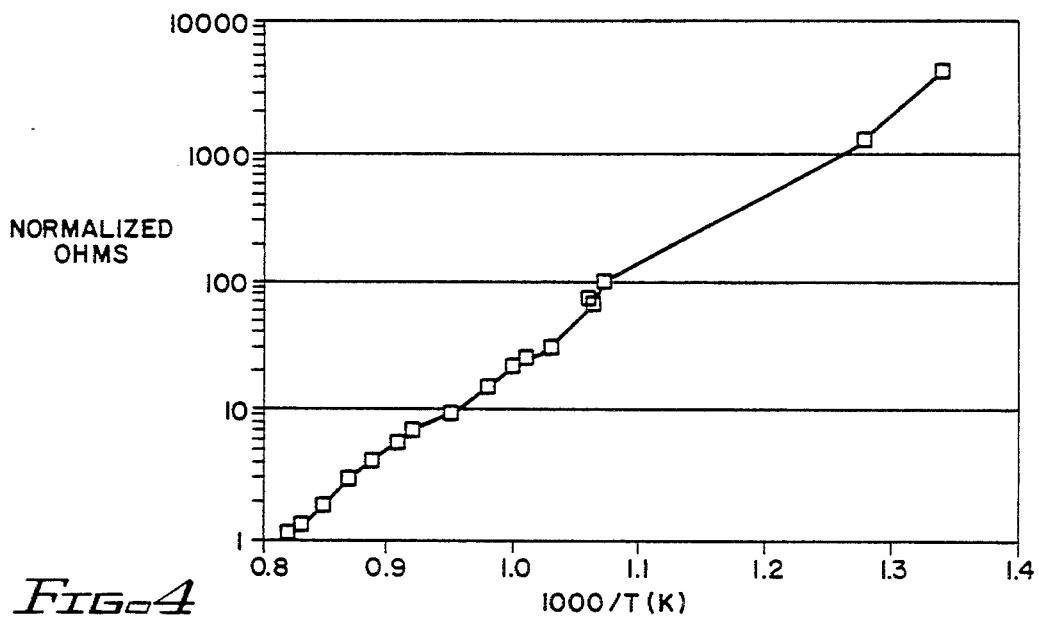
FIG. 4 is a graph of the log resistance vs. 1000/T/(K) of a yttria stabilized zirconia composite of the present invention.

FIG. 4 is a graph depicting the logarithm of the normalized DC resistance of a section of a yttria fully stabilized zirconia stabilized composite (9% yttria) as a function of the reciprocal Kelvin temperature. This sample did not have electrodes in place, but was instead placed between two porous silver/palladium coated metal grids as current pickups. The DC resistance of the composite at 1000° C. was about 100 ohms. Most of the resistance was due to the absence of normal electrodes and is reasonably linear for the test conditions. This figure depicts the resistance of the sample over a range of four orders of magnitude. The measured temperature included temperatures from 450° C. to 1000° C.

Figure 5:
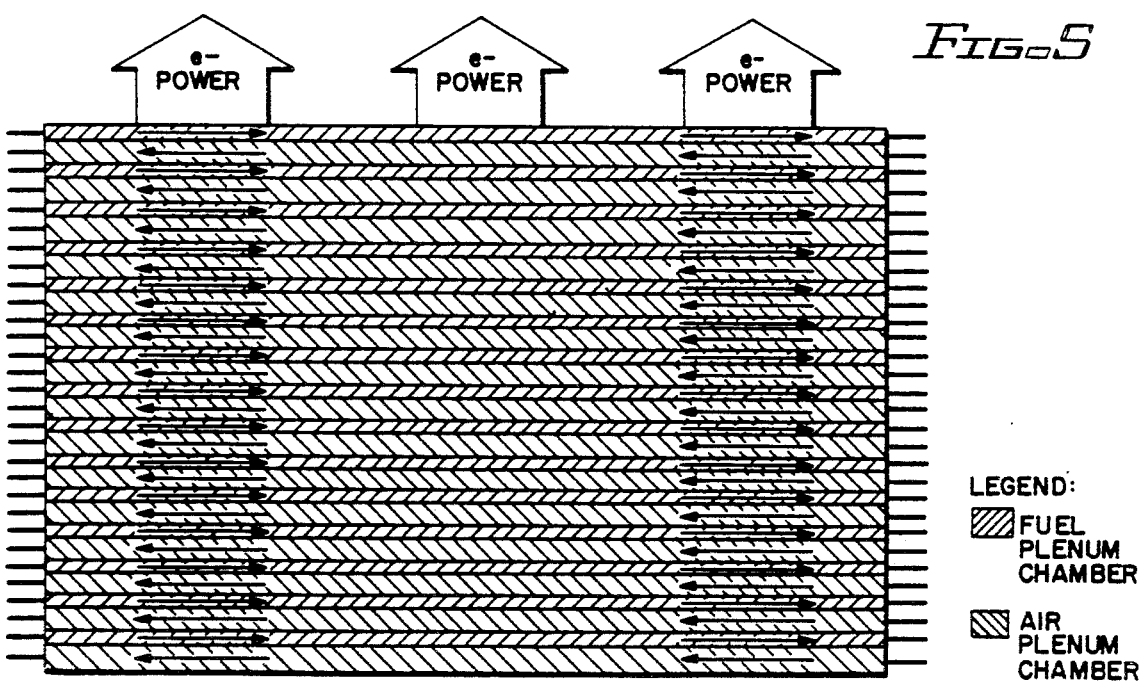
FIG. 5 is a schematic flow diagram of a manifolded multicell stack design in accordance with the present invention.

FIG. 5 is a schematic representation of a bipolar manifolded multicell stack the solid oxide electrolyte composite of the present invention. The ratio of size of air plenum chamber to fuel plenum chamber is 2:1 because of the greater volume of air passing through the system, compared to the fuel gas volume. The fuel and air gas streams do not come into contact with each other. They are kept isolated. Gas manifolding is preferably in parallel with current interrupts in the manifold to avoid short circuits between cells. The electrical power is in series.

The fuel cell of this invention may be incorporated into transportation vehicles, utility power system, sub-utility power systems, portable power devices, and the like.

The following examples illustrate the preparation of illustrative solid electrolyte.

EXAMPLE 1

An aqueous slurry of fine $ZrO_{2.91}Y_2O_3$ powder +0.25% polyvinylacetate was laser annealed using a $CO_2$ laser having a 10.6 wavelength, 600 W, ⅜ inch line, 0.005 inch. The ceramic melted, flowed and refroze without melting the metal support matrix. The annealing was done under flowing argon. A sample of composite was held on a computer controlled table and rastered under the $CO_2$ laser beam at a rate of 1 inch/sec. Very slow rates vaporized the sample and faster rates insufficiently melted the ceramic.

EXAMPLE 2

The slurry of Example 1 was painted onto Inconel 600 stainless steel foil and dried at 115° C. for 20 minutes. The sample was suspended in a 2" O.D. mullite furnace tube in a silicon carbide electron furnace tube, was flushed with argon and the argon flow left on. The temperature was raised at 5° C. per minute to 1340° C. for 3 hours and cooled to room temperature at 5° C. per minute. The procedure was repeated two more times. On the last slurry application the slurry was sucked into pores of the composite under vacuum on a Buchner funnel. The last firing was for 15 hours to density.

The invention claimed is:

1. A solid oxide fuel cell comprising a solid state electrolytic cell wherein the solid electrolyte is a ductile composite comprising a regular, ordered, repeating array of ductile intersupported continuous fibers intimately mixed with a ceramic matrix, and means for connecting said cell to an electrical load, whereby when current is generated from said cell, fuel and air are converted to electric power.

2. The solid oxide fuel cell of claim 1 wherein said ductile array is a metal mesh having a regular, ordered, repeating pattern.

3. The solid oxide fuel cell of claim 2 wherein said ordered, repeating pattern is a diamond shaped pattern.

4. The solid oxide fuel cell of claim 1 wherein a plurality of individual cells are arranged in a planar stack array, said cells separated by air plenum chambers and fuel plenum chambers.

5. The fuel cell of claim 4 wherein the array is in corrugated form.

6. The solid oxide fuel cell of claim 1 wherein said ductile composite electrolyte is employed in a tubular array.

7. A solid state fuel cell comprising a solid state electrolytic cell wherein the solid electrolyte is a composite comprising an ionically conductive ceramic phase substantially surrounded and supported by a continuous, ordered, ductile metallic array.

8. A solid state electrolytic laminar cell comprising: a center sheet of solid electrolyte composite comprising an ionically conductive ceramic material surrounding and supported by a continuous ordered ductile array of metallic fibers, the sheet having a top surface and a bottom surface;
a layer of mixed ionic and electronic conductive material coating each surface of the center sheet;
and a thin layer of electronically conductive and gas porous material coating each layer of the mixed conductive material, thereby forming a cathode on the bottom surface thereof and an anode on the top surface thereof.

9. The cell of claim 1 incorporated into a vehicular unit.

10. The cell of claim 1 incorporated into a utility power system.

11. A cell of claim 1 incorporated into a portable power source.

* * * * *